(12) United States Patent
Negishi

(10) Patent No.: US 7,734,445 B2
(45) Date of Patent: Jun. 8, 2010

(54) SHAPE MEASURING DEVICE AND METHOD

(75) Inventor: Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 12/171,453

(22) Filed: Jul. 11, 2008

(65) Prior Publication Data

US 2009/0024355 A1    Jan. 22, 2009

(30) Foreign Application Priority Data

Jul. 17, 2007   (JP) .............................. 2007-185623

(51) Int. Cl.
*G01B 5/012* (2006.01)
(52) U.S. Cl. ...................................... 702/168
(58) Field of Classification Search .................. 702/168
See application file for complete search history.

(56) References Cited

U.S. PATENT DOCUMENTS

| | | | |
|---|---|---|---|
| 3,266,113 A * | 8/1966 | Flanagan, Jr. ................. | 24/452 |
| 4,538,911 A | 9/1985 | Heynacher et al. .......... | 356/358 |
| 4,621,434 A | 11/1986 | Hirschmann ................. | 33/503 |
| 5,455,677 A | 10/1995 | Yoshizumi et al. .......... | 356/376 |
| 5,699,158 A | 12/1997 | Negishi ........................ | 356/345 |
| 5,917,181 A | 6/1999 | Yoshizumi et al. .......... | 250/230 |
| 5,966,681 A | 10/1999 | Bernhardt et al. ........... | 702/152 |

FOREIGN PATENT DOCUMENTS

| | | |
|---|---|---|
| DE | 195 27 268 | 2/1996 |
| DE | 10 2005 021 645 | 3/2006 |
| EP | 0 849 654 | 6/1998 |
| JP | 3063290 | 5/2000 |
| JP | 3272952 | 1/2002 |
| JP | 2005-37197 | 2/2005 |

* cited by examiner

*Primary Examiner*—Tung S Lau
(74) *Attorney, Agent, or Firm*—Fitzpatrick, Cella, Harper & Scinto

(57) ABSTRACT

A device measures a measurement object surface shape, and includes a base to which the measurement object is secured; a slide movable in at least three different directions and secured to the base; a probe holding unit mounted to the slide; and a contact probe resiliently supported by the holding unit so as to be movable with respect to the holding unit. Additional features include a unit measuring the position and posture of the probe with respect to the holding unit; a unit calculating a contact-force vector, which the probe receives from the measurement object, from a measurement result of the measuring unit; and a controlling unit moving the probe along the surface of the measurement object. The controlling unit also controls a position of the holding unit so that a magnitude of the contact-force vector comes closer to a control target value thereof in accordance with the magnitude of the contact-force vector.

8 Claims, 9 Drawing Sheets

SHAPE MEASURING DEVICE AND METHOD

BACKGROUND OF THE INVENTION

1. Field of the Invention

The present invention relates to a shape measuring method and a shape measuring device, including a contact probe that measures with high precision (that is, on the order of nanometers), the shape of a surface of an optical element (such as a lens or a mirror), and the shape of a surface of a die for producing the optical element. The present invention is applicable to, in particular, a shape measuring device that can measure a shape having a steep inclination angle, such as a wall having an angle of 90 degrees.

2. Description of the Related Art

In general, a contact-type shape measuring method and a contact-type shape measuring device, used to measure the shape of, for example, a lens or a mirror, have the following features.

FIG. 8 shows a first related example disclosed in Japanese Patent Registration No. 03272952. In FIG. 8, a contact probe 28 is supported by, for example, a leaf spring 27 so as to be movable in an axial direction with respect to a probe holding unit 26, and is controlled so that its displacement is constant. The position and posture of the probe holding unit 28 at this time are measured with a laser length measuring device 10, 11, 14 (also called an interferometer), and data of the position and data of the posture are calculated, to determine the displacement of the contact probe 28.

FIG. 9 shows a second related example disclosed in Japanese Patent Registration No. 03063290. In FIG. 9, a displacement sensor 10 that measures a displacement in an axial direction of a contact probe 2, supported so as to be movable in the axial direction, and that measures a displacement in a direction perpendicular to the axial direction is provided, to measure and correct the inclination of the contact probe 2.

FIGS. 10A and 10B show a third related example disclosed in Japanese Patent Laid-Open No. 2005-037197. In FIGS. 10A and 10B, a displacement sensor 5 that measures a displacement in a direction perpendicular to an axial direction of a contact probe 2 is provided. In addition, Japanese Patent Laid-Open No. 2005-037197 discusses a unit that estimates a horizontal contact force generated at a surface of a measurement object due to contact with the contact probe 2, a unit that detects a vertical contact force generated at the surface of the object due to contact with the contact probe 2, and a unit that detects inclination angle information at each measurement position of the surface of the measurement object. Further, the document discusses controlling contact force in the axial direction so that a vertical dragging force generated at the surface of the measurement object when a following operation is performed is constant.

Such shape measuring devices may be called a contour measuring device in other documents. The contact probes may be called a sensing pin, a sensing pin member, or a feeler in other documents, but will be called a probe in the specification. A laser length measuring device is a device that measures a length on the order of nanometers, and is also called an interferometer from its measurement principle. In the specification, the laser length measuring device is primarily called an interferometer. The term "contact force" may be used to mean a vertical dragging force.

The above-described related arts have the following problems.

(1) Difficulty in Stabilizing a Scanning Speed of the Contact Probe at a Steeply Inclined Surface The above-described related examples 1, 2, and 3 discuss methods of scanning a measurement surface while controlling the contact probe in the vertical direction. That is, a feed-back controlling operation using a contact force that the contact probe receives is carried out only in the vertical direction. However, since a scanning direction of the contact probe at an inclined surface always includes a vertical component, a scanning speed is always influenced by a control deviation of a following control operation of the contact probe. This influence becomes larger as the inclination angle becomes steeper, thereby making it difficult to stabilize the scanning speed of the contact probe. For a vertical surface having an inclination angle $\theta$ of 90 degrees, the control deviation of a controlling system that tries to make a contact force constant causes the scanning speed to change. As a result, the problems that a measurement precision is reduced and that the scanning speed of the probe cannot be increased occur. That is, it is difficult for the probe to scan a steeply inclined surface.

(2) Difficulty in Controlling Contact Force of Contact Probe at Steeply Inclined Surface The difficulty will be described with reference to FIG. 10B used in the aforementioned Japanese Patent Laid-Open No. 2005-037197. FIG. 10B shows the contact probe 2 in contact with a measurement object having an inclination angle of $\theta$. Here, the vertical contact force is Nz, the horizontal contact force is Nx, and a contact force in a direction of a normal line to a surface of the measurement object is Nn. In the related example 1, the contact probe 28 is controlled in the vertical direction so that the vertical contact force Nz in FIG. 10B is constant. In the related example 3, the contact probe 2 is controlled in the vertical direction so that the contact force Nn in the direction of the normal line to the surface of the measurement object is constant.

However, as the inclination angle $\theta$ becomes steeper, the amounts of change of Nz and Nn with respect to an amount of vertical movement of the contact probe are reduced. Therefore, it becomes difficult to control the probe so that the contact probe 2 follows a steeply inclined surface of the measurement surface, thereby resulting in the problem that a measurement precision is reduced and in the problem that the scanning speed cannot be increased. In particular, for a vertical surface having an inclination angle $\theta$ of 90 degrees, even if the contact probe 2 is moved vertically, the vertical contact force Nz and the contact force Nn in the direction of the normal line to the measurement surface 8 do not change. Therefore, the contact probe 2 is incapable of being controlled so that the contact probe 2 follows the measurement surface.

In the above-described related example 1, the controlling of the probe 28 is carried out with a Z slide 4. Since a movable area that covers an entire measurement area is required for the Z slide 4, the device becomes structurally large. Therefore, a high rigidity cannot be provided, and natural frequency is reduced. These effects appear within a control loop that makes the contact forces constant. Consequently, control gain cannot be made high. As a result, the frequency that allows the probe to follow the measurement surface is limited to a low value, thereby preventing the scanning speed from being increased.

SUMMARY OF THE INVENTION

The present invention is achieved in view of the unsolved problems of the related arts, and provides a shape measuring method and a shape measuring device that allow a probe to follow even a very steep surface. The present invention also provides a shape measuring method and a shape measuring device that can be used even for a vertical surface as a result of scanning in a direction perpendicular to a contact-force vector. As a result, a steeply inclined surface, such as a vertical surface, that is difficult to measure in the related arts can be measured with high speed and high precision.

A first aspect of the present invention provides a shape measuring device that measures a shape of a surface of a measurement object by measuring a position of a contact probe while the contact probe is moved along the surface of the measurement object. The shape measuring device comprises a base to which the measurement object is secured, a probe holding unit provided at XYZ slides mounted to the base and is movable three-dimensionally, the contact probe is resiliently supported so as to be movable with respect to the probe holding unit, a measuring unit measures the position and a posture of the contact probe with respect to the probe holding unit, and a calculating unit calculates a magnitude and a direction of a contact-force vector that the contact probe receives from the measurement object, from a measurement result of the measuring unit. In the shape measuring device, the contact probe is moved perpendicularly to the contact-force vector while controlling a position of the probe holding unit in a direction of the contact-force vector so that the magnitude of the contact force is constant.

A second aspect of the present invention provides a shape measuring method that measures a shape of a surface of a measurement object by measuring a position of a contact probe while moving the contact probe, which is resiliently supported by a probe holding unit whose movement is controllable three-dimensionally. The method comprises the step of contacting the contact probe with the measurement object, the step of determining a contact-force vector by measuring a change in the position and a posture of the contact probe with respect to the probe holding unit, and the step of measuring the shape of the surface of the measurement object by moving the contact probe perpendicularly to the contact-force vector while controlling the position of the contact probe in a direction of the contact-force vector so that a magnitude of the contact-force vector is constant.

The present invention makes it possible to control a contact force of the probe even with respect to a steeply inclined surface by controlling the contact probe in the direction of the contact-force vector. In addition, since the probe performs scanning perpendicularly to the contact-force vector, the probe can even scan a steeply inclined surface. Further, since a fine adjustment table that can move at a high speed controls the contact force, the followability of the probe with respect to a measurement surface is increased, so that a measurement time can be reduced.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
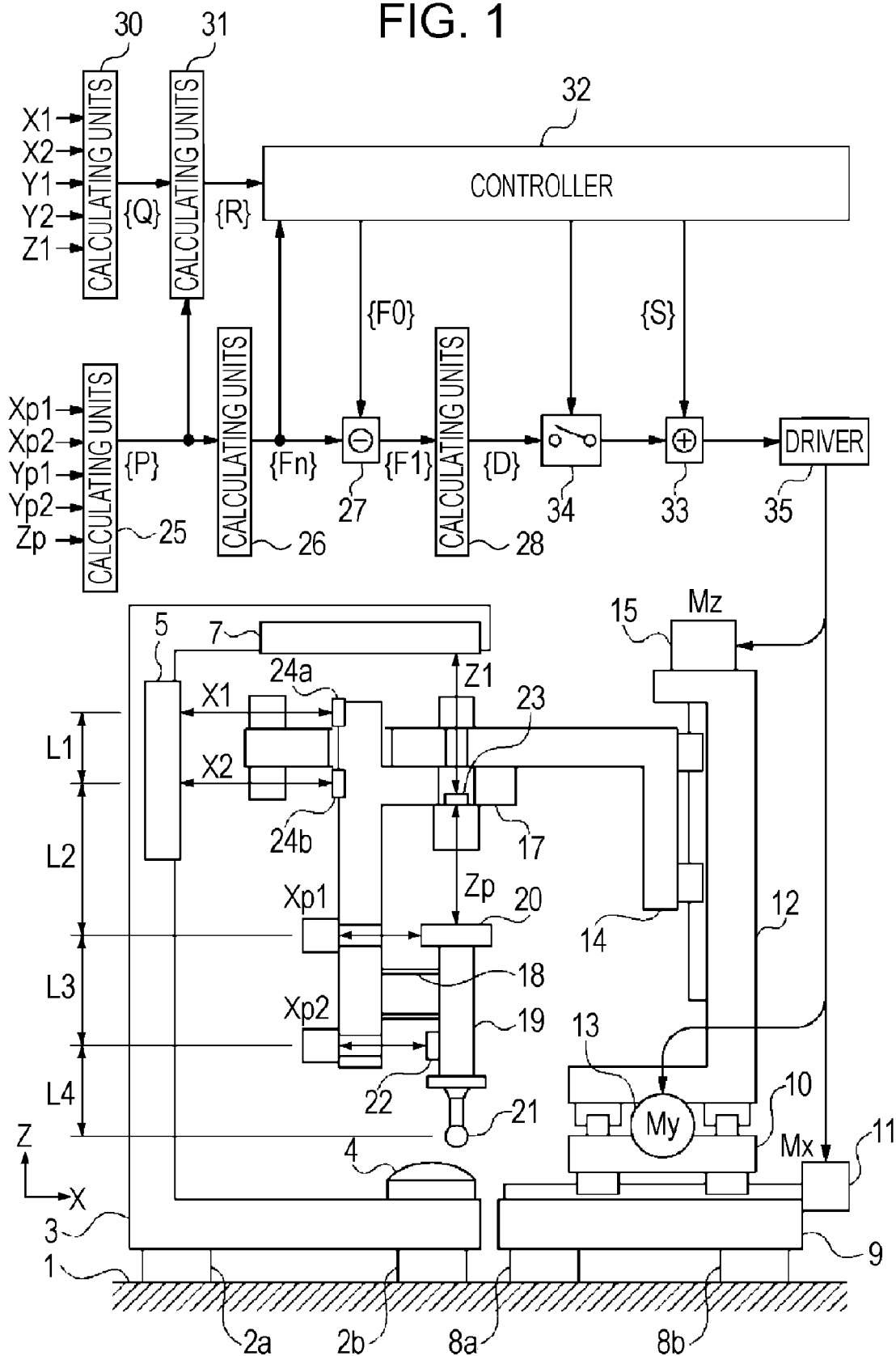
FIG. 1 is a schematic view of a shape measuring device according to a first embodiment of the present invention.

FIG. 1 is a schematic view of a shape measuring device according to a first embodiment of the present invention. Shock-absorbing tables 2a and 2b are provided on a floor 1 where a shape measuring device is installed, and a measurement base 3 is provided on the shock-absorbing tables 2a and 2b. By virtue of such a structure, a slight vibration of the floor is attenuated, so that it is not transmitted to the measurement base 3. The base 3 is a member for securing a reference mirror, which serves as a position reference, and a measurement object. In the measuring device, the position of a point on a surface of the measurement object is measured with respect to three of the reference mirrors.

The measurement base 3 has a box-like structure. Since the measurement base 3 serves as a reference for measurements, it is formed of a material having a small linear thermal expansion coefficient, such as cast iron having a low thermal expansion. In FIG. 1, the measurement base 3 has a U shape. Its rigidity can be increased by forming it into a box-like structure by mounting a wall or a column perpendicularly to a sheet plane of FIG. 1. A measurement object 4 is placed on the measurement base 3. An X-reference mirror 5 (serving as a measurement reference in a horizontal direction), a Y-reference mirror (not shown), and a Z-reference mirror 7 (serving as a measurement reference in a vertical direction) are held by the measurement base 3. These reference mirrors serve as positional references when measuring distances with a laser length measuring unit (also called an "interferometer"). The measuring device is provided for measuring points on a surface of a measurement object with the three X, Y, and Z mirrors serving as positional references.

Next, a scanning axis for conveying a probe will be described. Shock-absorbing tables 8a and 8b are secured to and installed on the floor 1, and a scanning-axis base 9 is provided on the shock-absorbing tables 8a and 8b. An X-axis slide 10 and an X-axis motor 11 are secured to and provided at the scanning-axis base 9 so as to be movable in an X direction in FIG. 1. A Y-axis slide 12 and a Y-axis motor 13 are secured to and provided at the slide 10 so as to be movable in a Y direction. A Z-axis slide 14 and a Z-axis motor 15 are secured to and provided at the Y-axis slide 12 so as to be movable in a Z direction. By virtue of this structure, the Z-axis slide 14 is movable three-dimensionally in the X, Y, and Z directions. A probe holding unit 17 of a probe is secured to and provided at the Z-axis slide 14, and a probe shaft 19 supported by a leaf spring 18 is provided. The leaf spring may be formed of, for example, one or two thin metallic plates, and may have either a structure supported at both sides or a cantilever structure as illustrated. The probe shaft 19 is formed of a material having a small thermal expansion coefficient, to ensure its stability when performing a measurement.

A three-surface mirror 20 having mirror surfaces in the Z direction and the horizontal directions (X and Y directions) is secured to and provided at the top end of the probe shaft 19. An end ball 21 that contacts a measurement object is provided at the other end of the probe shaft 19. A small mirror 22 that measures displacements of the lower end of the probe in the horizontal directions, that is, in the X and Y directions is secured to and provided at the probe shaft 19. Two interferometers for measuring the position and posture of the probe are provided in the Z-axis direction at the probe holding unit 17. First, interferometers Xp1 and Xp2 that measure an amount of movement in the X direction are secured and provided at the probe holding unit 17, to measure the distance to the small mirror 22 and to the three-surface mirror 20, secured to the probe shaft. Although not shown, similarly, in the Y direction, two interferometers Yp1 and Yp2 measure the distance to the small mirror 22 and to the three-surface mirror 20, secured to the probe shaft. In addition, an interferometer Zp that performs a measurement in the Z direction is secured to and provided at the probe holding unit 17, and measures the distance in the Z direction to the three-surface mirror 20 at the probe. A small mirror 23 is provided at the upper surface of the interferometer Zp. A Z-axis interferometer Z1 that measures the distance between the small mirror 23 and the Z-reference mirror 7 is secured to and provided at the Z-axis slide 14. A measurement axis of the Z-axis interferometer is disposed so as to pass through the probe axis and the center of the end ball 21.

Small mirrors 24a and 24b for measuring the distance to the X-reference mirror 5 at two locations are provided at the probe holding unit 17. X-axis interferometers X1 and X2 for measuring this distance are secured to and provided at the Z-axis slide 14. Although not shown, similarly, in the Y direction, Y-axis interferometers Y1 and Y2 are secured to and provided at the Z-axis slide 14. The distances measured with the laser length measuring units (also called interferometers) are represented by the same symbols used to represent the interferometers. For example, the distance measured with the interferometer X1 is represented by X1. Distances in a height direction where the horizontal interferometers are installed are represented by the following symbols:

L1 represents the distance between the interferometers X1 and X2 (or distance between the interferometers Y1 and Y2 (not shown))

L2 represents the distance between the interferometers X2 and Xp1 (or distance between the interferometers Y2 and Yp1)

L3 represents the distance between the interferometers Xp1 and Xp2 (or distance between the interferometers Yp1 and Yp2)

L4 represents the distance between the interferometer Xp2 and the center position of the probe end ball 21 (or distance between the interferometer Yp2 (not shown) and the center position of the probe end ball 21)

Next, a controlling system will be described. In FIG. 1, braces indicate one-dimensional array data. For example, braces are used to represent three-dimensional position and direction vector. Numbers are added to suffixes when elements of the array data are to be represented. For example, the elements of $\{P\}$ are represented by, for example, $P_1$ and $P_2$.

The five interferometers Xp1, Xp2, Yp1, Yp2, and Zp that measure the distances to the mirrors, mounted to the probe, from the probe holding unit 17 are guided to a probe position/posture calculating unit 25, to calculate the vector $\{P\}$ that represents the posture of the probe and the center position of the probe end ball 21. There are a total of six elements of $\{P\}$, that is, three-dimensional X, Y, and Z coordinates and three rotational angles representing posture, that is, $\theta x$ (rotational angle around the X axis), $\theta y$ (rotational angle around the Y axis, and $\theta z$ (rotational angle around the Z axis). From geometrical considerations, they can be calculated using the following formulas.

First, the X, Y, and Z positions can be calculated using Formulas (1) to (3):

$$P_1 = Xp1 + (Xp2 - Xp1)*(L3 + L4)/L3 \quad (1)$$

$$P_2 = Yp1 + (Yp2 - Yp1)*(L3 + L4)/L3 \quad (2)$$

$$P_3 = -Zp \quad (3)$$

The three rotational angles representing the posture can be calculated using Formulas (4) to (6):

$$P_4 = (Yp2 - Yp1)/L3 \quad (4)$$

$$P_5 = -(Xp2 - Xp1)/L3 \quad (5)$$

$$P_6 = 0 \quad (6)$$

The signs are determined on the basis of the mounting directions of the interferometers, and how the coordinate system is formed. $P_6$ is the rotational angle around the Z axis, and is zero because it is not measured in this embodiment.

$\{P\}$ is guided to a contact-force calculating unit 26. From previously determined rigidities Kx, Ky, and Kz, and the center position of the probe end ball calculated by the probe position/posture calculating unit 25 using Formulas (1) to (3), a contact-force vector $\{Fn\}$ is calculated.

Next, the contact-force vector calculating unit that calculates the contact-force vector (both the direction and magnitude) from measurement results of a second measuring unit and previously determined rigidities in the resilient support of the probe will be described. The contact-force vector is received from a measurement object by the probe.

Figure 2:
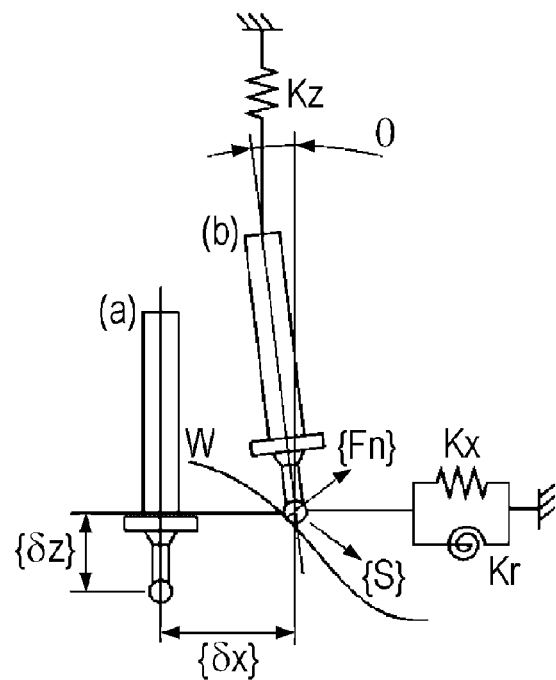
FIG. 2 is a schematic view of a contact probe illustrated for describing an operation according to the present invention.

FIG. 2 is a schematic view of a contact probe when it contacts an inclined surface. (a) represents the probe before it contacts a measurement surface. (b) represents the probe whose position and posture are changed when it contacts the measurement surface and receives the contact force $\{Fn\}$. For the sake of simplifying the description, the description concerning the Y direction will be omitted, but this is not a problem when generalities are considered. Here, the symbols are defined as follows. The rigidities of the probe are previously determined as follows.

Kz Z-direction rigidity of the probe
Kx X-direction rigidity of the probe
Kr Rotational-direction rigidity of the probe
$\delta z$ Z-direction displacement of the probe end ball
$\delta x$ X-direction displacement of the probe end ball
$\theta$ Angular displacement of the probe
W Surface of a measurement object
$\{Fn\}$ Contact-force vector
$\{e\}$ Unit vector in the direction of the contact-force vector. That is, $\{e\} = \{Fn\}/|\{Fn\}|$
F0 Target contact force
$\{F1\}$ Contact-force deviation vector
$\{D\}$ Control amount in X, Y, and Z directions regarding contact force
$\{S\}$ Control amount in X, Y, and Z directions regarding scanning Kz can be determined from the amount of movement in the Z direction when a force in the Z direction is applied to the probe end ball. Kx can be determined from the amount of movement in the X direction when a force in the X direction is applied to the probe end ball. From the second measuring unit, the position and posture of the probe are measured, to calculate the positions δz and δx of the probe end ball using the position and the posture of the probe. The specific structure of the measuring units and the specific measuring method will be described in the embodiment section. Using the measured values δz and δx and the previously determined rigidities Kx and Kz of the probe, the contact-force vector {Fn} can be calculated as follows.

An X-direction component of {Fn} is Kxδx, and a Z-direction component of {Fn} is Kzδz. For the explanation, the unit vector in the direction of the contact-force vector {Fn} is {e}. That is, {e}={Fn}/|{Fn}|. Here, |{Fn}| represents the magnitude of the contact-force vector {Fn}. The contact-force vector {Fn} is guided to a contact-force deviation calculating unit 27. Using a previously determined contact-force target value F0, the contact-force deviation vector {F1} is calculated. F0, which is the contact-force target value, is previously stored in a controller 32.

Figure 3:
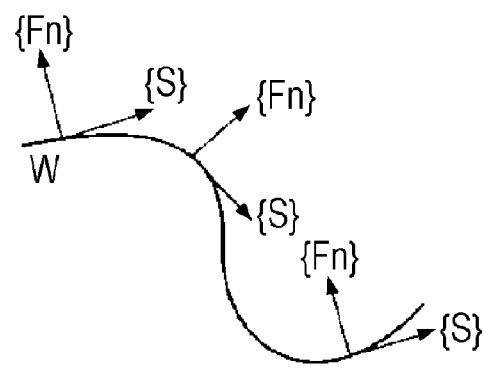
FIG. 3 illustrates a scanning direction and contact forces, for describing the operation according to the present invention.

Next, a scanning-direction calculating unit that calculates a scanning direction that is perpendicular to the contact-force vector will be described using FIG. 3. The scanning of the contact probe is carried out in a locus (having, for example, a tapestry form or a spiral form), so that a front side of a measurement surface is included. At this time, the position and the posture of the probe are measured, so that, here, the locus need not be precisely matched with a target locus. Instead, it is important that the scanning direction be in a direction perpendicular to the contact-force vector or {Fn} in FIG. 3. If the scanning direction {S} is in a direction perpendicular to the contact-force vector, a measurement surface can be scanned even if the measurement surface is a steeply inclined surface or a vertical surface, which cannot be properly scanned in the related arts.

Next, a contact-force feedback controlling unit that adjusts the amount of movement of the X, Y, and Z slides in the contact-force vector direction so that the magnitude of the contact-force vector is constant will be described. The aforementioned contact-force vector {Fn} and the previously determined magnitude of the contact force target value F0 are compared with each other, to calculate the contact-force deviation vector {F1}. More specifically, {F1} is calculated by the following Formula (7):

$$\{F1\}=\{Fn\}*(|\{Fn\}|-F0)/|\{Fn\}|=(|\{Fn\}|-F0)\{e\} \quad (7)$$

Since the magnitude of the contact-force deviation vector is zero, the X, Y, and Z slides are moved in the direction of the contact force {Fn}. The amounts thereof, that is, the control amount of the X, Y, and Z slides is represented by {D}. When the X, Y, and Z axes move in accordance with {D}, the probe holding unit moves, so that the probe moves, thereby making it possible to control the contact-force deviation vector {F1} to zero. Even if the measurement surface is a steeply inclined surface or a vertical surface, the contact force is measured, and the control amount in the direction of the contact force is provided, thereby making it possible to control {F1}. Controlling {F1} to zero means that the magnitude of the contact-force vector {Fn} is controlled to F0, which is the target value.

Accordingly, even if the shape of the measurement object is defined by a steeply inclined surface or a vertical surface, the X, Y, and Z slides can be controlled in the direction of the contact force, so that the followability with respect to the measurement surface can be controlled with high precision.

A method of moving the X, Y, and Z slides in accordance with the scanning direction while, at the same time, controlling the contact force will be described with reference to FIG. 3. That the contact force is controlled by controlling the X, Y, and Z slides in the direction of the contact force {Fn} has already been discussed. While feedback control of the contact force is performed, the X, Y, and Z slides are caused to perform scanning in the aforementioned scanning direction {S}. Since, as mentioned above, the scanning direction is determined so as to be perpendicular to the contact-force vector {Fn}, even if it is moved to the {S} direction, the controlling system of the contact force {Fn} is not influenced. Therefore, controlling systems can be independently formed. As a result, the scanning can be carried out while controlling the contact force.

The contact-force deviation vector {F1} is guided to a control amount calculating unit 28 for the contact force, to calculate the control amount {D} of the contact force. The control amount {D} is guided to a switching circuit 34 that is controlled by the controller 32, to switch between outputting {D} and outputting zero. When {D} is output, the contact force is controlled so as to be constant. When zero is output, this controlling operation is not carried out. The controller 32 is a computer that controls the entire shape measuring device.

An output of the switching circuit 34 shown in FIG. 1 is connected to an adding circuit 33, and the control amount {S} in the X-axis, Y-axis, and Z-axis scanning operations output from the controller 32 is added, to calculate the control amount of the X, Y, and Z axes. An output of the adding circuit 33 is connected to an XYZ axis driver 35. The XYZ axis driver 35 adds an input control amount to a current position of the X, Y, and Z axes, to calculate a target position. Then, the X, Y, and Z axis driver 35 moves the X, Y, and Z axes to the target position.

When the switching circuit outputs {D}, that is, when feedback control of the contact force is performed, the control amount {D} is transmitted through the adding circuit 33, so that the X, Y, and Z axes are moved through the XYZ axis driver 35. As a result, the probe holding unit 17 secured to the Z axis moves three-dimensionally in the direction of {D}. This causes the probe 19, connected to the probe holding unit, and the end ball 21 of the probe 19 to move in the direction of {D}, that is, in the direction in which the contact-force deviation {F1} becomes closer to zero. The contact-force feedback controlling system can control the contact-force deviation {F1} to zero, and, thus, the magnitude of the contract-force vector {Fn} to the target contact force F0. Since the feedback control is achieved in no matter what direction the contact-force vector is oriented, the direction of the measurement surface is not limited either. That is, the controlling system can be formed so that it can be used for a steeply inclined surface, including a vertical surface. In addition, as shown in FIG. 3, since the two control amounts {D} and {S} are perpendicular to each other, they do not influence each other, so that the controlling systems thereof can be independently formed.

In contrast, when the switching circuit 34 outputs zero, the X, Y, and Z axes are controlled on the basis of only the scanning direction {S} of the X, Y, and Z axes output from the controller 32. This controlling operation is required when the positions of the X, Y, and Z axes are to be moved when the probe is not contacting the measurement surface.

The five-axes laser measuring units (interferometers) X1, X2, Y1, Y2, and Z1 that measure the position and posture of the probe holding unit 17 are guided to a probe-holding-unit position calculating unit 30, to calculate a vector {Q} that represents the position and posture of the probe end ball 21 at the center position. There are a total of six elements of {Q}, that is, three-dimensional X, Y, and Z coordinates, and three rotational angles representing posture, that is, θx (rotational angle around the X axis), θy (rotational angle around the Y axis), and θz (rotational angle around the Z axis). From geometrical considerations, calculations can be performed using the following formulas.

First, the X, Y, and Z positions can be calculated using the following Formulas (8) to (12):

$$Q_1 = X1 + (X2-X1)*(L1+L2+L3+L4)/L1 \quad (8)$$

$$Q_2 = Y1 + (Y2-Y1)*(L1+L2+L3+L4)/L1 \quad (9)$$

$$Q_3 = -Z1 \quad (10)$$

The three rotation angles representing the posture can be calculated using the following Formulas (11) to (13):

$$Q_4 = (Y2-Y2)/L3 \quad (11)$$

$$Q_5 = -(X2-X1)/L3 \quad (12)$$

$$Q_6 = 0 \quad (13)$$

The signs are determined on the basis of the mounting directions of the interferometers, and how the coordinate system is formed. $Q_6$ is the rotational angle around the Z axis, and is zero because it is not measured in this embodiment.

{Q} is guided to a probe end ball position calculating unit 31, and a position {R} of the probe end ball is calculated using the following Formulas (14) to (16):

$$R_1 = P_1 + Q_1 \quad (14)$$

$$R_2 = P_2 + Q_2 \quad (15)$$

$$R_3 = P_3 + Q_3 \quad (16)$$

These positions are the results of measuring the shape in which the position of the end ball is measured, with the position of the reference mirrors serving as position references. The position {R} is connected to the controller 32. As mentioned above, the controller 32 is a computer that controls the entire shape measuring device, and {R}, which is the measurement result, is stored in the computer.

Figure 4:
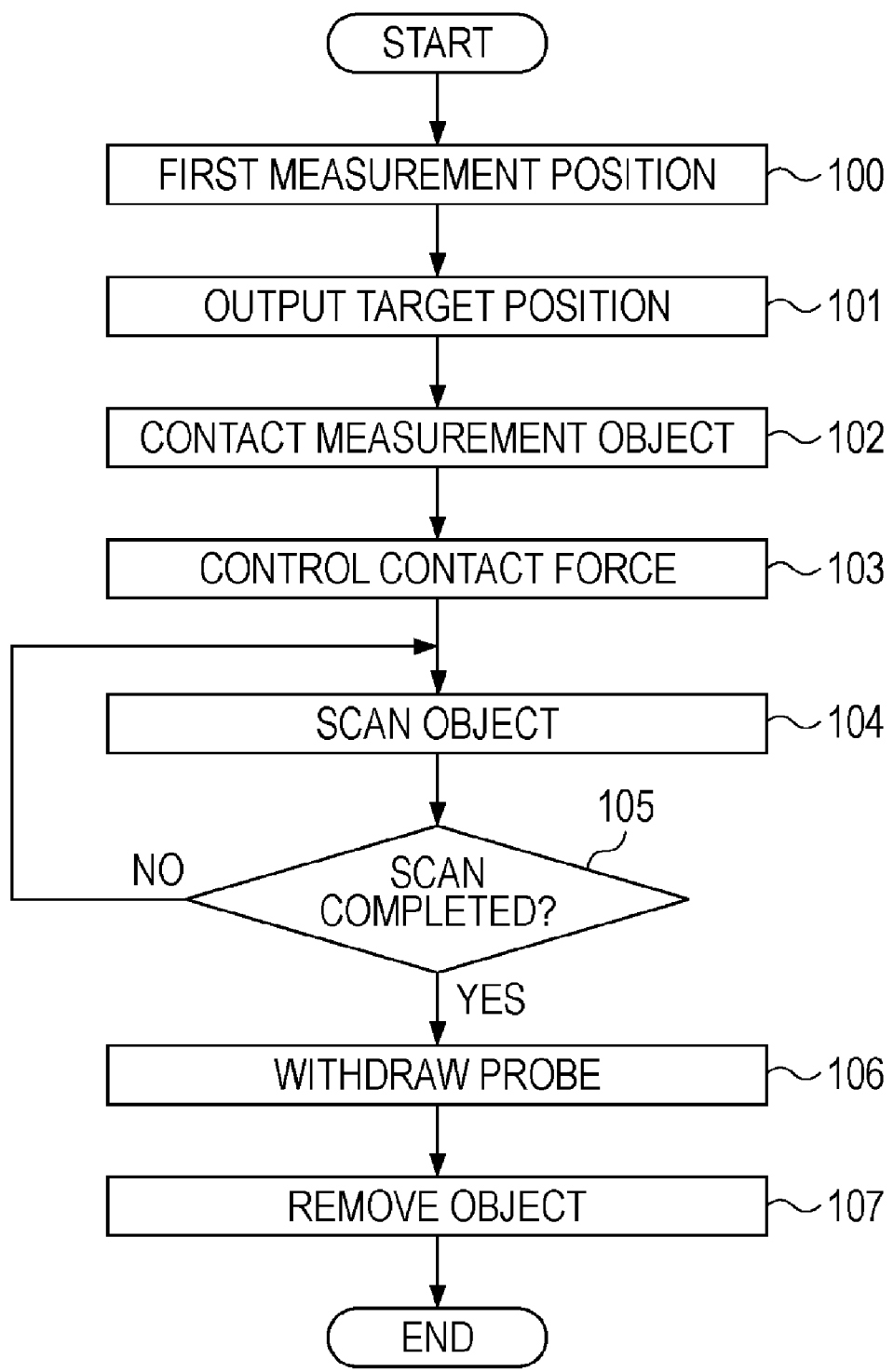
FIG. 4 is a flowchart illustrating operation steps according to the embodiment of the present invention.

FIG. 4 is a flowchart of the operation. In an initial state, the switching circuit 34 is in a state in which it outputs zero, and the probe is withdrawn to a location above a measurement object.

First, the measurement object 4 is set on the measurement base 3.

Next, the X axis and the Y axis are moved to a first measurement position (Step 100). Next, the controller 32 sets the switching circuit 34 in a position control state, that is, in a state in which it outputs zero, to output a target position {S} to the X and Y axes. The target position {S} is used later as a scanning target position. To prevent the probe and the measurement object from colliding with each other during movement, the Z axis is not moved, so that only the X and Y axes are moved (Step 101).

Next, the Z axis is lowered to where the probe contacts the measurement object. Then, while the controller 32 monitors a contact force {Fn}, the Z axis is lowered. When the end ball 21 of the probe contacts the measurement object 4, the contact force {Fn} is generated, so that the Z axis stops when the contact force is detected (Step 102). That is, from the probe position/posture measuring units Xp1, Xp2, Yp1, Yp2, and Zp, the position {P} of the probe end ball is calculated using the Formula (2). In addition, from previously determined probe rigidities, the contact force {Fn} is calculated.

Next, the switching circuit 34 is switched, and the X, Y, and Z axes are used to control the contact force so that the contact force becomes constant (Step 103). The controller 32 switches the switching circuit 34 to a contact-force control state, that is, in a state in which it outputs {D}. That is, the difference {F1} between the contact force {Fn} and the target contact force F0 is calculated from Formula (1), to calculate the control amount {D} regarding these contact forces. Next, in accordance with {D}, the positions of the X, Y, and Z axes are controlled through the XYZ axis driver 35. By operating the X, Y, and Z axes as mentioned above, the magnitude of the contact force {Fn} can be controlled to the target contact force F0.

Next, the probe performs scanning, so that the position {R} of the probe end ball is stored (Step 104). The controller 32 calculates a scanning direction that is perpendicular to the contact vector {Fn}, to output a control amount {S} regarding the scanning. The {S} is added to the control amount {D} regarding the contact-force control, to move the X, Y, and Z axes through the XYZ axis driver 35. While carrying out the scanning, the position {R} of the probe end ball is calculated using Formula (6), and is stored.

Next, Step 104 is repeated until the scanning of all the measurement areas is completed (Step 105). When the measurement is completed, the process proceeds to the following step.

Next, the probe is withdrawn from the measurement object (Step 106). After completing the scanning of the measurement areas, the controller 32 switches the switching circuit 34 to the position control state, that is, the state in which it outputs zero. Then, the Z axis is withdrawn to separate the measurement object and the probe from each other.

Next, the measurement object is removed from the device, and the measurement is completed (Step 107). Lastly, the shape of the measurement surface is measured from signals from the first and second measuring units.

The first measuring unit determines the position and posture of the probe holding unit with reference to a reference surface, and the second measuring unit determines the position and posture of the probe with reference to the probe holding unit. Therefore, from these measurement amounts, the position and posture of the probe are determined with reference to the reference surface. From the position and posture of the probe, the center position of the probe end ball can be calculated on the basis of geometric considerations. Since, for this position, the reference surface serves as a reference, a high-precision measuring device can be realized without being influenced by position/posture errors of the probe holding unit or position/posture errors of the probe. A specific measuring method, calculating method, or structure of the measuring units for this time depend upon, for example, how the measuring units are mounted, so that they will be described later in this embodiment.

According to the shape measuring device described above, the three-dimensional contact force between the probe and the measurement object, that is, the contact-force vector, is determined. By controlling the contact-force vector to a constant value, the problems of the related arts are overcome, and the following advantages are provided.

1) Even for a steeply inclined surface, feedback control of the contact force of the probe can be performed. Even when the measurement surface is a vertical surface, the vertical surface can be measured due to a controlling operation in the direction of the contact-force vector. 2) Even for a steeply inclined surface, probe scanning can be performed. Since the scanning is carried out perpendicularly to the contact-force vector, the scanning does not influence the feedback control of the contact force.

According to this method, the inclination angle of the measurement object is not limited. For example, the probe can follow a vertical surface.

In general, a laser length measuring unit is directly influenced by a change in the refractive index of air. Therefore, it is possible to carry out the following in the existing technology. That is, a wavelength tracker is added to this structure, to correct variations in wavelength during measurement, so that measurement precision is increased. In the embodiment, the contact-force calculating unit 26, the probe position/posture calculating unit 25, the contact-force deviation calculating unit 27, etc. are used. Since these units perform calculations, software in a computer may be used to similarly perform these calculations. In the specification, expressions that clearly describe the operations are chosen. In addition, although the Z direction is described as being a vertical direction, it may be changed to a horizontal direction. Further, although a laser length measuring unit is used as the second measuring unit, a measuring sensor, such as a capacitance length measuring unit, may also be used.

In the embodiment, a structure in which the contact probe is supported by a leaf spring is described. However, a structure using an air bearing that supports the contact probe through an air film as discussed in Patent Registration No. 03063290 may also be used.

Second Embodiment

Figure 5:
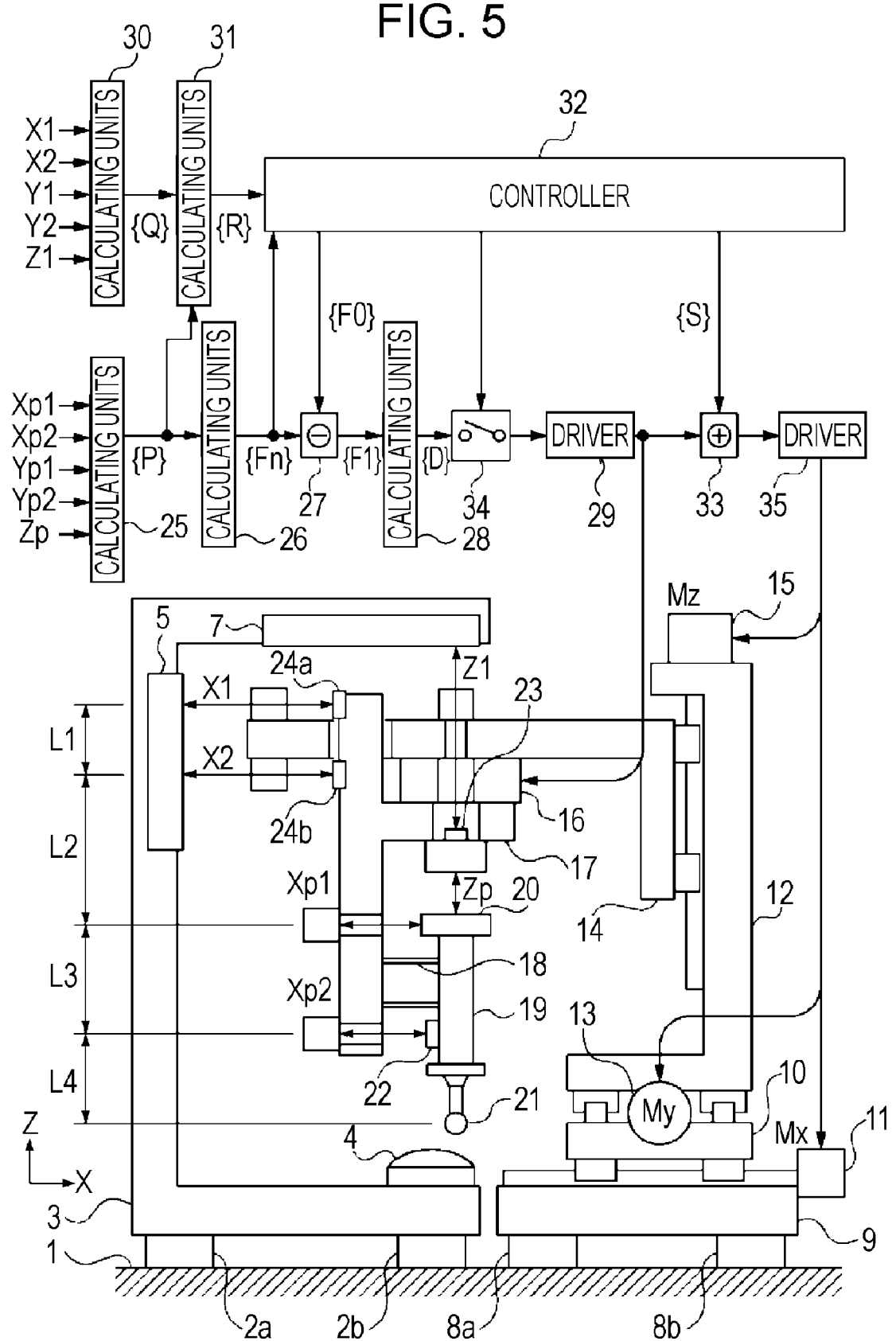
FIG. 5 is a schematic view of a shape measuring device according to a second embodiment of the present invention.

A second embodiment of the present invention will be described using FIG. 5. Since the second embodiment differs from the first embodiment in a fine-adjustment table, only the fine-adjustment table will be described. A fine-adjustment table 16 is provided at a Z-axis slide 14 so as to be movable in X, Y, and Z directions. A probe holding unit 17 of a probe is secured to and provided at the fine-adjustment table 16.

Next, a controlling system will be described. Five interferometers Xp1, Xp2, Yp1, Yp2, and Zp that measure the distance to mirrors mounted to the probe are guided to a probe position/posture calculating unit 25, so that a vector {P} that represents the posture of the probe and the center position of a probe end ball 21 is calculated.

An output of a switching circuit 34 is connected to a driver 29 for the fine-adjustment table, and an output of the driver 29 is connected to the fine-adjustment table 16, to move the fine-adjustment table 16. A feedback control thereof causes the fine-adjustment table 16 to move, thereby moving the probe, to control a contact force.

The position of the fine-adjustment table that is output by the driver 29 is connected to an adding circuit 33, and a control amount {S} of X-, Y-, and Z-axis scanning, output from a controller 32, is added, to calculate the control amount of the X, Y, and Z axes. An output of the adding circuit 33 is connected to an XYZ axis driver 35. The XYZ axis driver 35 adds the input control amount to the current positions of the X, Y, and X axes, to calculate a target position, and to move the X, Y, and Z axes to the target position. A stroke of the fine-adjustment table is small. By controlling the X, Y, and Z axes, the amount of movement of the fine-adjustment table is canceled, so that it is zero at all times, that is, so that it is within a stroke range. It is described above that the movement amount of the fine-adjustment table that controls the contact force is {D}. Therefore, the amounts of movement of the X, Y, and Z axes are in a direction that is the same as the direction in which it is cancelled (direction of {D}). Controlling the contact force causes the direction in which the X, Y, and Z axes move to be the same as that in the first embodiment.

Next, a contact-force feedback controlling unit that adjusts the amount of movement of the fine-adjustment table in the direction of a contact-force vector so that the magnitude of the contact-force vector is constant will be described. In addition, a position feedback controlling unit that adjusts the amounts of movement of the X, Y, and Z slides so that the amount of movement of the fine-adjustment table becomes small will be described.

Although the fine-adjustment table has a small stroke, it can be made highly rigid using, for example, a piezo actuator.

As in the first embodiment, a contact-force vector {Fn} and a magnitude F0 of a previously determined target contact force are compared with each other, to calculate a contact-force deviation vector {F1}. To set the magnitude of the contact-force deviation vector to zero, the fine-adjustment table is moved in the direction of the contact force {Fn}. This amount, that is, the X, Y, and Z control amount is represented by {D}.

However, since the stroke of the fine-adjustment table is limited, it cannot be used as it is. Accordingly, the amounts of movement of the X, Y, and Z slides are adjusted so that the amount of movement of the fine-adjustment table becomes small. That is, the amounts of movement of the X, Y, and Z slides are canceled by the amount of movement of the fine-adjustment table. Therefore, the amount of movement of the X, Y, and Z slides is in the direction of {D}, that is, in the direction of the contact-force vector {Fn}, so that they are the same as those in the first embodiment.

Since the contact force is controlled using the fine-adjustment table allowing high-speed control, the deviation in controlling the contact force can be reduced. In addition, even if the shape of a measurement object is changed suddenly, the position of the probe can be adjusted at a high speed because the fine-adjustment table is used.

Since the controlling operation that sets the contact force acting between the contact probe and the measurement object to a constant value is influenced by the followability of the probe, practically speaking, the high-speed controlling operation is important. This is because, if the followability of the probe is poor, the scanning speed of the probe cannot be increased. As discussed in the section regarding the problems of the related art, the X, Y, and Z movement axes often become large structures when large measurement areas are provided. In general, the natural frequency of large structures cannot be increased, thereby limiting the natural frequency at a control band. The present invention aims at increasing the followability of the probe by using the fine-adjustment table.

According to the present invention, since the contact force is controlled using the fine-adjustment table that allows a high-speed controlling operation, a shape measuring method and a shape measuring device in which the probe has high followability with respect to a measurement surface can be realized.

The shape measuring device according to the second embodiment described above has the following advantages in addition to those according to the first embodiment. That is, compared to the X, Y, and Z slides, the fine-adjustment table has a small stroke, so that it can be highly rigid. Therefore, controlling the contact force using the fine-adjustment table makes it possible to perform scanning at a higher speed than by the structure described in the first embodiment. Consequently, the measurement time can be reduced, and costs required for the measurements can be reduced compared to those in the first embodiment.

Third Embodiment

Figure 6:
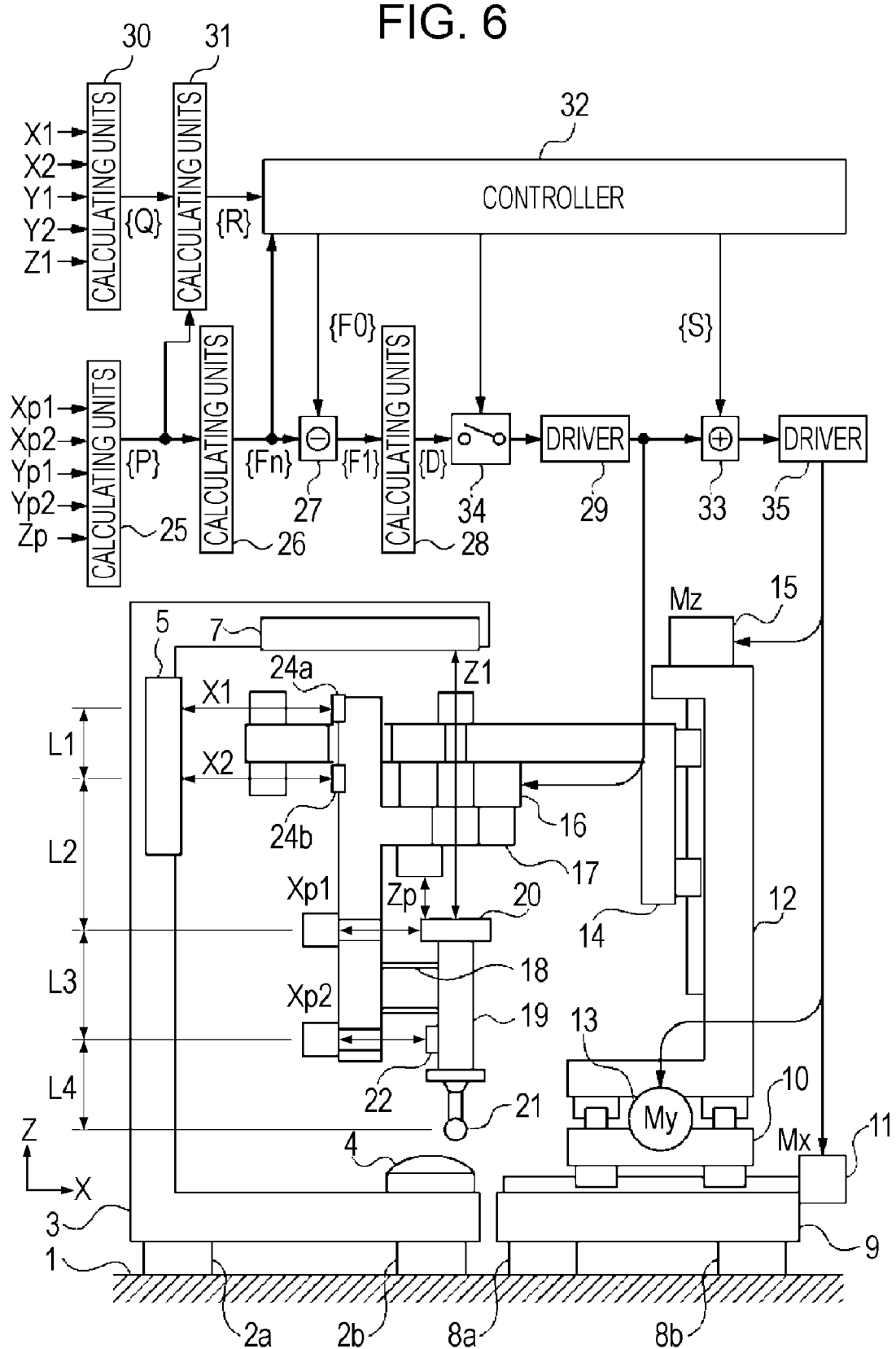
FIG. 6 is a schematic view of a shape measuring device according to a third embodiment of the present invention.

The third embodiment according to the present invention will be described with reference to FIG. 6. The third embodiment differs from the second embodiment in the structure of a measuring unit in the Z direction of a probe.

An interferometer Z1 directly measures the distance between a reference mirror 7 and a three-surface mirror 20 having mirror surfaces in X, Y, and Z directions. The position of a probe end ball is calculated not by using Formula (6), but by using the following Formulas (17) to (19) in which calculation of a Z coordinate is changed. Only $R_3$, which represents a Z coordinate, differs.

$$R_1 = P_1 + Q_1 \quad (17)$$

$$R_2 = P_2 + Q_2 \quad (18)$$

$$R_3 = R_3 \quad (19)$$

As discussed in the section regarding the solving of the problems, in general, a measurement value includes a randomly changing error. The first measuring unit measures the position and posture of the probe holding unit with respect to a reference surface, and the second measuring unit determines the position and posture of the probe with respect to the probe holding unit. When the position and posture of the probe are measured from the measurement values of these two measuring units, two random errors are introduced into the calculated values of the first and second measuring units. In contrast, in the embodiment, since the position of the probe with respect to a reference surface is directly measured, there is only one randomly changing error. This makes it possible to achieve a measuring device providing higher precision.

Example 1

Figure 7:
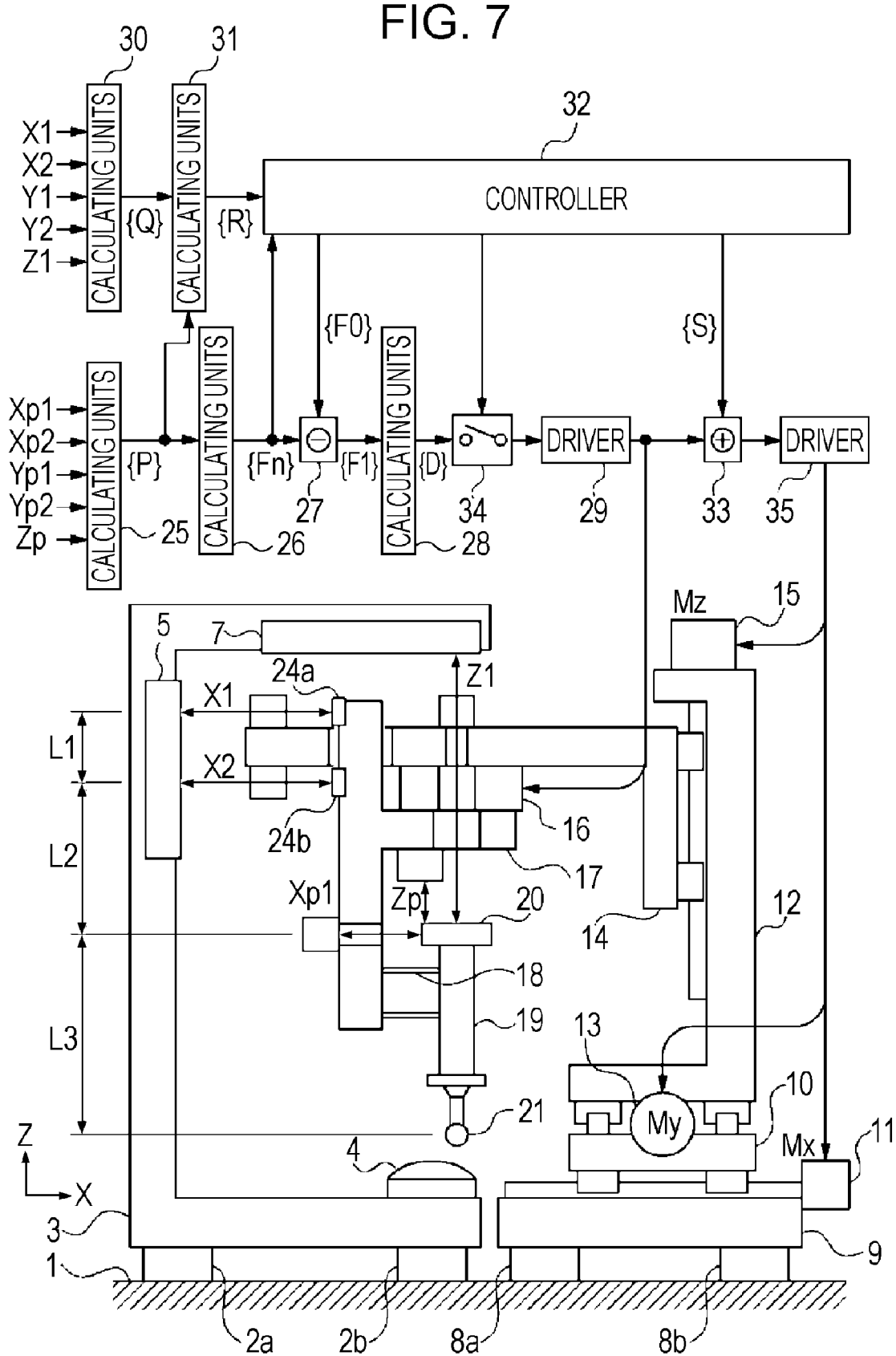
FIG. 7 is a schematic view of a shape measuring device according to an example of the present invention.
Figure 8:
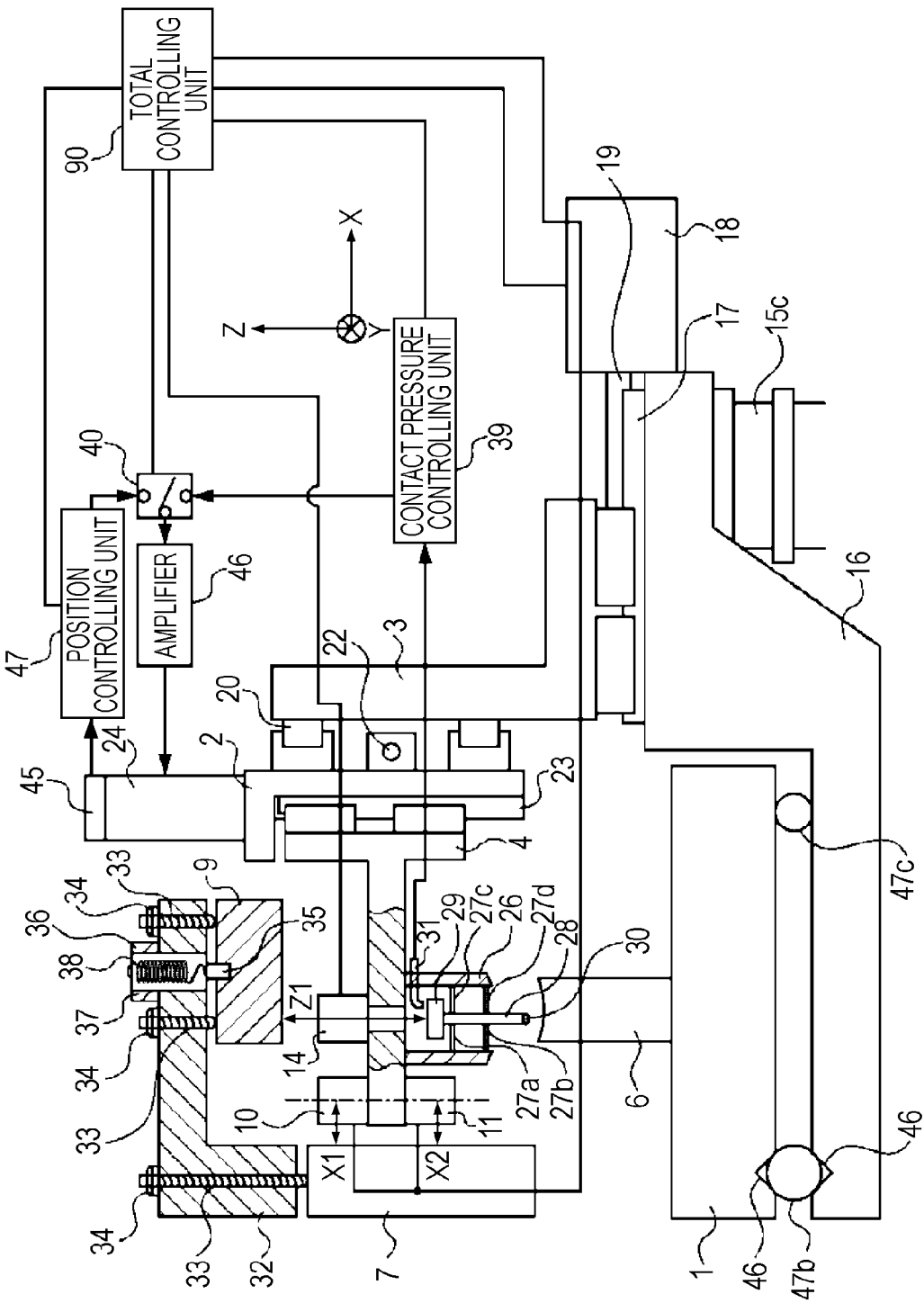
FIG. 8 is a schematic view of a shape measuring device according to a first related art.
Figure 9:
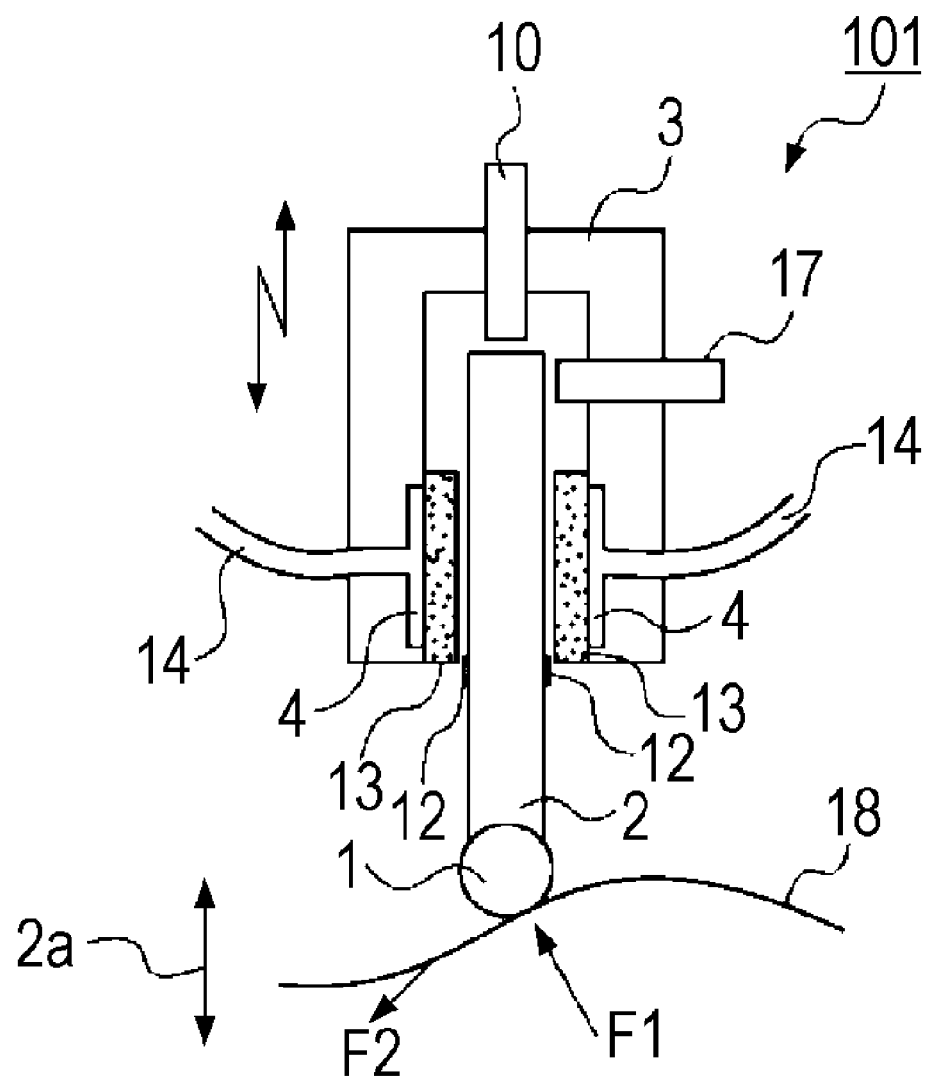
FIG. 9 is a schematic view of a contact probe according to a second related art.
Figure 10A:
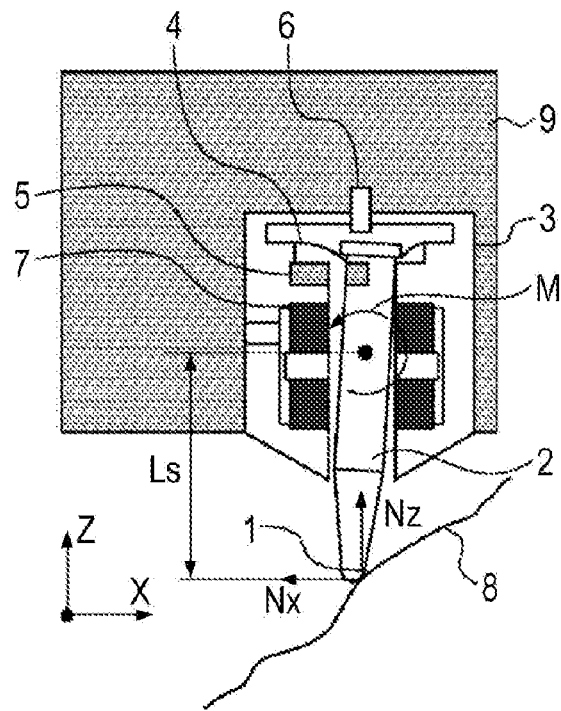
FIGS. 10A and 10B are schematic views of a contact probe according to a third related art.
Figure 10B:
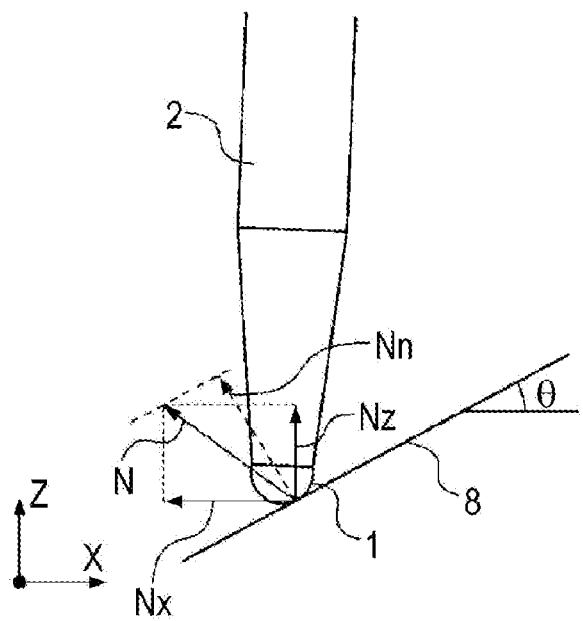

An example to which the present invention is applicable will be described with reference to FIG. 7. The structure shown in FIG. 7 differs from that shown in FIG. 6 in the unit that measures the position/posture of a probe. In FIG. 7, the posture of the probe is easily measured by measuring a displacement Xp of a three-surface mirror 20 disposed opposite to an end ball 21.

A contact force between the probe and a measurement object causes the position/posture of the probe to change. Among the directions, the Z direction is measured with a Zp interferometer. Since the rotational angle around the Z axis does not directly influence the measurement, the rotational angle need not be measured. The remaining component is a force in a horizontal direction. The point of application of the contact force may be thought of as being fixed substantially at the end ball. Therefore, the relationship between the displacement of the three-surface mirror, disposed opposite to the end ball of the probe, and the horizontal force applied to the end ball is actually measured or is previously calculated by, for example, a finite element method. This makes it possible to determine the horizontal displacement at an end and contact force by measuring the displacement of the three-surface mirror.

According to the example, since the posture of the probe can be more simply measured, it is effective in reducing costs of the device. In addition, although the example is described using a laser length measuring unit (interferometer) as an Xp measuring unit, other measuring units, such as a capacitance displacement meter or a current displacement meter, may also be used.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-185623 filed Jul. 17, 2007, which is hereby incorporated by reference herein in its entirety.

What is claimed is:

1. A shape measuring device that measures a shape of a surface of a measurement object, the shape measuring device comprising:
a base to which the measurement object is secured;
a slide movable in at least three different directions and secured to the base;
a probe holding unit configured to hold the probe, and mounted to the slide;
a contact probe resiliently supported by the probe holding unit to move along the surface of the measurement object;
a measuring unit configured to measure the position and a posture of the contact probe with respect to the probe holding unit;
a calculating unit configured to calculate a contact-force vector, which the contact probe receives from the measurement object, from a measurement result of the measuring unit; and
a controlling unit configured to move the contact probe along the surface of the measurement object, and to control a position of the probe holding unit so that a magnitude of the contact-force vector comes closer to a control target value thereof in accordance with the magnitude of the contact-force vector.

2. The shape measuring device according to claim 1, wherein the probe holding unit is provided at the slide and at a table held so as to be movable with respect to the slide, and wherein the controlling unit controls the table to control a position of the probe holding unit in a direction of the contact-force vector.

3. The shape measuring device according to claim 1, wherein the measuring unit includes an interferometer that measures the position and the posture of the contact probe, and wherein a position of the contact probe in a direction perpendicular to the base is directly measured with the interferometer.

4. The shape measuring device according to claim 1, wherein the controlling unit operates to control the position of the contact probe holding unit so that the contact probe moves perpendicularly to a direction of the contact-force vector, and so that the magnitude of the contact-force vector becomes a constant control target value.

5. A shape measuring device that measures a shape of a surface of a measurement object, the shape measuring device comprising:
a base to which the measurement object is secured;
a slide movable in at least three different directions and secured to the base;
a probe holding unit configured to hold the probe, and mounted to the slide;
a contact probe resiliently supported by the probe holding unit to move along the surface of the measurement object; and
a measuring unit configured to measure the position and a posture of the contact probe with respect to the probe holding unit,
wherein the contact probe is moved along the surface of the measurement object, and a position of the probe holding unit is controlled so that a magnitude of a contact-force vector comes closer to a control target value thereof, the contact-force vector being determined from a measurement result of the measuring unit and being received by the contact probe from the measurement object.

6. A method of measuring a shape of a surface of a measurement object by moving a contact probe, resiliently supported by a probe holding unit that is movable in at least three different directions, along the surface of the measurement object, and by measuring a position of the contact probe, the method comprising the steps of:

bringing the contact probe into contact with the measurement object;

determining a contact-force vector on the basis of a result of measurement of a change in the position and a posture of the contact probe with respect to the probe holding unit; and measuring the shape of the surface of the measurement object as a result of controlling the position of the contact probe so that a magnitude of the contact-force vector comes closer to a control target value thereof in accordance with the magnitude of the contact-force vector, and as a result of moving the contact probe along the surface of the measurement object.

7. The method according to claim 6, wherein the contact-force vector is calculated as a resilient force determined from a rigidity of the contact probe and the change in the position and the posture of the contact probe, determined in the determining step, with respect to the probe holding unit.

8. The method according to claim 6, wherein, in the step of measuring the shape of the surface of the measurement object, the magnitude of the contact-force vector is controlled so as to become a constant control target value, and the contact probe is moved perpendicularly to a direction of the contact-force vector, to move the contact probe along the surface of the measurement object.

* * * * *